United States Patent
Lee et al.

(10) Patent No.: US 6,865,389 B2
(45) Date of Patent: Mar. 8, 2005

(54) SYSTEM AND METHOD FOR A VIRTUAL SOFT HANDOVER IN A HIGH DATA RATE NETWORK BASED ON DATA TRANSMISSION INFORMATION

(75) Inventors: Bo Lee, Plano, TX (US); Yvonne Wang, Dallas, TX (US)

(73) Assignee: Telefonaktiegolaget LM Ericsson, Stockholm (SE)

( * ) Notice: Subject to any disclaimer, the term of this patent is extended or adjusted under 35 U.S.C. 154(b) by 667 days.

(21) Appl. No.: 09/947,244

(22) Filed: Sep. 5, 2001

(65) Prior Publication Data

US 2003/0045293 A1 Mar. 6, 2003

(51) Int. Cl.[7] .............................................. H04Q 7/20
(52) U.S. Cl. .................. 455/442; 455/436; 455/437
(58) Field of Search ................................ 455/442, 437, 455/436, 422.1, 67.11, 550.1; 370/331, 332, 333, 334

(56) References Cited

U.S. PATENT DOCUMENTS

| | | | |
|---|---|---|---|
| 5,912,878 A | 6/1999 | Park et al. ............... 370/229 |
| 5,920,817 A | 7/1999 | Umeda et al. ............ 455/437 |
| 5,943,328 A | 8/1999 | Hosford .................... 370/331 |
| 6,002,933 A | * 12/1999 | Bender et al. ............ 455/442 |
| 6,018,521 A | 1/2000 | Timbs et al. ............. 370/342 |
| 6,069,883 A | * 5/2000 | Ejzak et al. .............. 370/335 |
| 6,108,546 A | 8/2000 | Kusaki et al. ............ 455/436 |
| 6,192,029 B1 | * 2/2001 | Averbuch et al. ........ 370/229 |
| 2001/0006513 A1 | * 7/2001 | Kim .......................... 370/331 |
| 2001/0043579 A1 | * 11/2001 | Tourunen et al. ........ 370/331 |
| 2003/0002460 A1 | * 1/2003 | English .................... 370/331 |

FOREIGN PATENT DOCUMENTS

| | | | |
|---|---|---|---|
| EP | 0 332 818 A | 9/1989 | |
| EP | 0 746 172 A | 12/1996 | |
| EP | 0 912 012 A2 | 4/1999 | |
| EP | 0 987 915 A2 | 3/2000 | |
| EP | 0 987 915 A3 | 9/2000 | |
| EP | 1 059 823 A1 | 12/2000 | |
| GB | 2376603 A | * 12/2002 | ............ H04Q/7/38 |
| WO | WO 98/47302 | 10/1998 | |

* cited by examiner

*Primary Examiner*—Fan Tsang
*Assistant Examiner*—Matthew Genack (57) ABSTRACT

A Virtual Soft Handover (VSHO) process for high data rate (HDR) applications is disclosed that considers the total number packets remaining to be transmitted prior to initiating the VSHO. An HDR mobile terminal maintains data transmission information relating to an amount of data to be transmitted during a data transfer in progress during a data session. The data transmission information may include, for example, the total packet size of a data transmission and the data transmission status (i.e., the number of packets remaining to be transmitted). The decision of whether to perform a VSHO is made according to the data transmission information. In one embodiment, a VSHO may be deactivated when the number of packets remaining to be transmitted is less than a certain threshold. In other embodiments, a VSHO may not be performed if the total packet size is smaller than a certain threshold.

16 Claims, 5 Drawing Sheets

SYSTEM AND METHOD FOR A VIRTUAL SOFT HANDOVER IN A HIGH DATA RATE NETWORK BASED ON DATA TRANSMISSION INFORMATION

BACKGROUND OF THE INVENTION

1. Field of the Invention

The present invention relates generally to high data rate cellular networks, and specifically to performing handovers within high data rate cellular networks.

2. Description of Related Art

High Data Rate (HDR) is a technology originally developed for dedicated packet data applications to meet the increasing demand for wireless Internet Protocol (IP) connectivity with high spectral efficiency. Voice transmissions require low data rates, but maintain stringent delay and jitter requirements. Packet data transmissions, on the other hand, typically require bursty high data rates, with less stringent delay and jitter requirements. The HDR principle is to separate high-speed data completely from the voice network, so that the packet data requirements can be fulfilled optimally and independently.

Within an HDR cellular network, such as a Code Division Multiple Access (CDMA) 2000 network, an HDR base station, whether a stand-alone node or integrated within a voice base station, operates on a 1.25 MHZ carrier that is allocated for packet data only. The HDR base station further employs a single shared, time division multiplexed (TDM) forward link, where only a single terminal is served at any instance. The forward link throughput rate is shared by all HDR mobile terminals. A mobile terminal selects a serving sector (or cell) of the base station by pointing its Data Rate Control (DRC) to the sector and requesting a forward data rate according to the channel condition (i.e., based on the Carrier to Interference (C/I) ratio of the channel). A multi-user scheduler at the HDR base station is responsible for granting actual data rates to each mobile terminal. The multi-user scheduler within the HDR base station "fairly" distributes the throughput rate for all mobile terminals pointing their DRC's on the same sector.

When a mobile terminal connects to an HDR base station, both the mobile station and the HDR base station maintain an Active set of pilots. The pilots within the Active set represent the sectors currently serving the mobile terminal. Each sector currently serving the mobile terminal has a forward traffic channel, a reverse traffic channel and a Medium Access Control Channel assigned to the mobile terminal. Based on the C/I ratio measurements for each sector currently serving the mobile terminal, the mobile terminal can point it's DRC to the serving sector with the best radio channel conditions in order to obtain a potentially higher data rate. The process of changing the serving sector that the mobile terminal points it's DRC towards is termed a Virtual Soft Handover (VSHO). The VSHO process involves signal exchanges within the HDR base station and between the mobile terminal and the HDR base station, and typically requires redundant Abis interface traffic for the two serving sectors during the VSHO. The VSHO process is especially advantageous when the total number of packets remaining to be transmitted over the air interface to the mobile terminal is significantly large as compared with the signaling and redundant Abis interface traffic necessitated by the VSHO process. However, performing a VSHO for only a small number of packets is an inefficient use of network resources. Therefore, what is needed is a VSHO process that considers the total number of packets remaining to be transmitted before initiating the VSHO.

SUMMARY OF THE INVENTION

The present invention provides a Virtual Soft Handover (VSHO) process for high data rate (HDR) applications that considers the total number packets remaining to be transmitted prior to initiating the VSHO. An HDR mobile terminal maintains data transmission information relating to an amount of data to be transmitted during a data transfer in progress during a data session. The decision of whether to perform a VSHO is made according to the data transmission information. As an example, the data transmission information may include the total data length (e.g., the total number of data packets) of a data transfer. In one embodiment, a VSHO may be deactivated when the number of packets remaining to be transmitted is less than a certain threshold. Alternatively, the data transmission information may include the data transmission status (i.e., the number of packets remaining to be transmitted). In other embodiments, a VSHO may not be performed if the total packet size is smaller than a certain threshold.

Advantageously, by considering the packet transmission status in addition to the channel conditions prior to initiating a VSHO, inefficient use of radio resources may be avoided. In addition, the VSHO process of the present invention may reduce congestion, improve interference and improve customer satisfaction for the network operator. Furthermore, the VSHO process of the present invention may improve a user's total data throughput and reduce the user's cost.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

The numerous innovative teachings of the present application will be described with particular reference to the exemplary embodiments. However, it should be understood that these embodiments provide only a few examples of the many advantageous uses of the innovative teachings herein.

In general, statements made in the specification of the present application do not necessarily delimit any of the various claimed inventions. Moreover, some statements may apply to some inventive features, but not to others.

Figure 1:
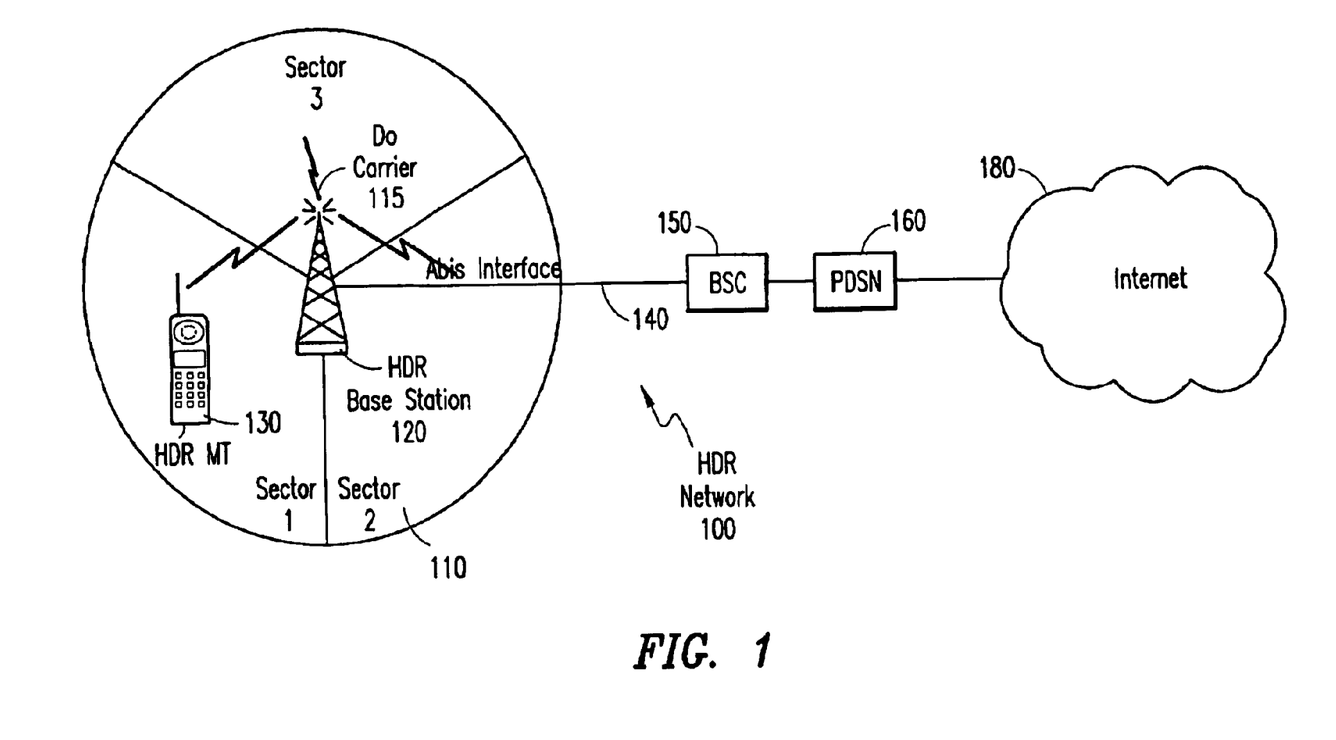
FIG. 1 is a block diagram of an exemplary High Data Rate (HDR) cellular network.

FIG. 1 illustrates a High Data Rate (HDR) cellular network 100, such as a CDMA 2000 network. The HDR cellular network 100 may support data rates up to at least 2 Mbps per user and uses higher order modulation schemes and a High Data Rate (HDR) base station 120 to support such high data rates. It should be understood that the HDR base station 120 provides the RF interface (carrier 115) between a mobile terminal 130 and the network 100 via one or more transceivers. The HDR base station 120 provides a separate 1.25 MHZ data only (DO) carrier 115 for HDR applications for each sector 110 (or cell) served by the HDR base station 120. A separate base station or carrier (not shown) provides the voice carrier(s) for voice applications.

An HDR mobile terminal 130 may be a DO mobile terminal or a dual mode mobile terminal capable of utilizing both voice services and data services. To engage in a data session, the HDR mobile terminal 130 connects to a DO carrier 115 to use the DO high-speed data service. The data session is controlled by a Packet Data Service Node (PDSN) 160, which routes all data packets between the HDR mobile terminal 130 and the Internet 180. The PDSN 160 has a direct connection to a Base Station Controller (BSC) 150 of the HDR base station 120. The BSC 150 is connected to the HDR base station 120 via an Abis interface interface 140. In addition, the BSC 150 is responsible for operation, maintenance and administration of the HDR base station 120, speech coding, rate adaptation and handling of the radio resources. It should be understood that the BSC 150 may be a separate node or may be co-located with one or more HDR base stations 120.

Each HDR base station 120 is shown serving three sectors 110 (or cells). However, it should be understood that each HDR base station 120 may serve only a single cell (referred to as an omni cell). For each sector 110 (or cell), the HDR base station 120 further employs a single shared, time division multiplexed (TDM) forward link, where only a single HDR mobile terminal 130 is served at any instance. The forward link throughput rate is shared by all HDR mobile terminals 130. An HDR mobile terminal 130 selects a serving sector 110 (or cell) of the HDR base station 120 for a data session by pointing its Data Rate Control (DRC) towards the sector 110 and requesting a forward data rate according to the channel conditions (i.e., based on the Carrier to Interference (C/I) ratio of the channel). A multi-user scheduler at the HDR base station 120 is responsible for granting actual data rates to each HDR mobile terminal 130. The multi-user scheduler within the HDR base station 120 "fairly" distributes the throughput rate for all HDR mobile terminals 130 pointing their DRC's towards the same sector 110.

When a mobile terminal 130 connects to an HDR base station 120, both the mobile station 130 and the HDR base station 120 maintain an active set of pilots. The pilots within the active set represent the sectors 110 currently serving the mobile terminal 120. It should be understood that the sectors 110 within the active set may be served by the same or different HDR base stations 120. Each sector 110 currently serving the mobile terminal 130 has a forward traffic channel, a reverse traffic channel and a Medium Access Control Channel assigned to the mobile terminal 130. Periodically, the mobile terminal 130 measures the Carrier to Interference (C/I) ratio of each serving sector 110, and points it's DRC to the serving sector 110 with the best radio 110 channel conditions in order to obtain a potentially higher data rate.

The process of changing the serving sector 110 that the HDR mobile terminal 130 points it's DRC towards is termed a Virtual Soft Handover (VSHO) in the CDMA 2000 network.

However, it should be understood that the VSHO of the CDMA 2000 network is similar to the cell selection used in CDMA and WCDMA networks, and therefore, the VSHO process described herein applies equally to CDMA and WCDMA networks and any other type of network using a similar handover procedure where the mobile terminal makes the handover or cell selection decision. As discussed above, the VSHO process involves signal exchanges within the HDR base station 120 and between the HDR mobile terminal 130 and the HDR base station 120, and typically requires redundant Abis interface 140 traffic for the two serving sectors 110 during the VSHO. Therefore, the VSHO process is an inefficient use of network resources when the total number of packets remaining to be transmitted over the air interface to the HDR mobile terminal 130 is small.

Figure 2:
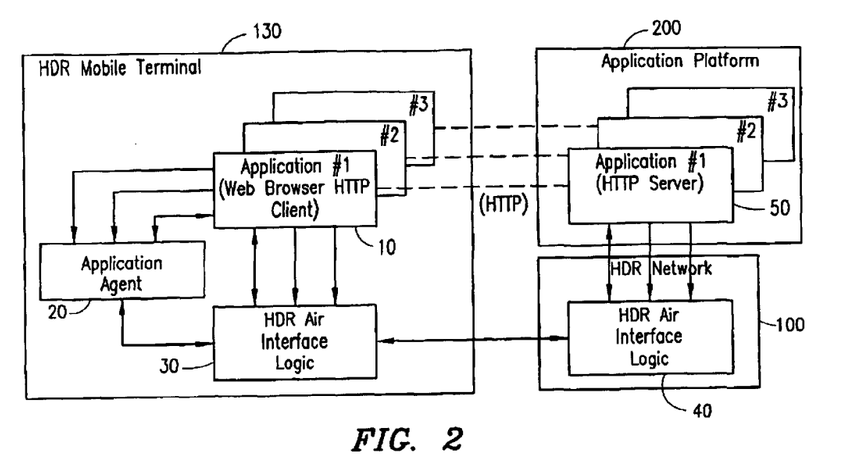
FIG. 2 is a functional block diagram illustrating the high data rate connection between an HDR mobile terminal and a web-based application.

Referring now to FIG. 2 of the drawings, in accordance with embodiments of the present invention, in order to utilize data transmission information, such as the total data length or data transmission status (i.e., the number of packets remaining to be transmitted), when deciding whether to perform a VSHO, an Application Agent 20 is included within the HDR mobile terminal 130. The Application Agent 20 bridges the control interoperation between HDR air interface logic 30 within the HDR mobile terminal 130 and various internal Applications 10, such as a Web Browser (HTTP) client application. The Application Agent 20 may be implemented as a combination of one or more of hardware, software and/or firmware. Although control information is routed through the Application Agent 20, all data is routed directly between the HDR air interface logic 30 and the Application 10. The HDR air interface logic 30 may include, for example, a transceiver and logic for formatting data sent over the air interface between the HDR mobile terminal 130 and the HDR network 100. Likewise, the HDR network 100 includes HDR air interface logic 30 for formatting and transmitting data over the air interface to the HDR mobile terminal 130.

On the network side, Applications 50, such as an HTTP server, may be resident in different Application platforms 200. A Web Browser 10 within the HDR mobile terminal 130 may access a particular HTTP server 50 by sending a request through the Application Agent 20 to the HDR air interface logic 30. Once a physical connection (illustrated by solid lines) is established, data can be downloaded from the HTTP server 50 to the Web Browser 10, as is logically illustrated by dotted lines. Such data may include one or more web pages of a web site.

Most web browsers currently provide the capability to indicate the downloading status when browsing a web site. As an example, after the Web Browser 10 in the HDR Access Terminal 130 sends an HTTP GET request to the HTTP server 50, the total data length (i.e., total number of data packets) may be sent to the Web Browser 10 in addition to the requested data. Furthermore, during the transmission of the data, the HTTP server 50 may send data information, such as the amount of data (i.e., number of data packets) included in each transmission. Typically, the total length and data information is received at the Web Browser 10 through an Application Programming Interface (API) (not shown) of the Web Browser 10. In accordance with embodiments of the present invention, the total data length and data information is transmitted from the Web Browser 10 to the Application Agent 20 for use in making VSHO decisions.

Figure 3:
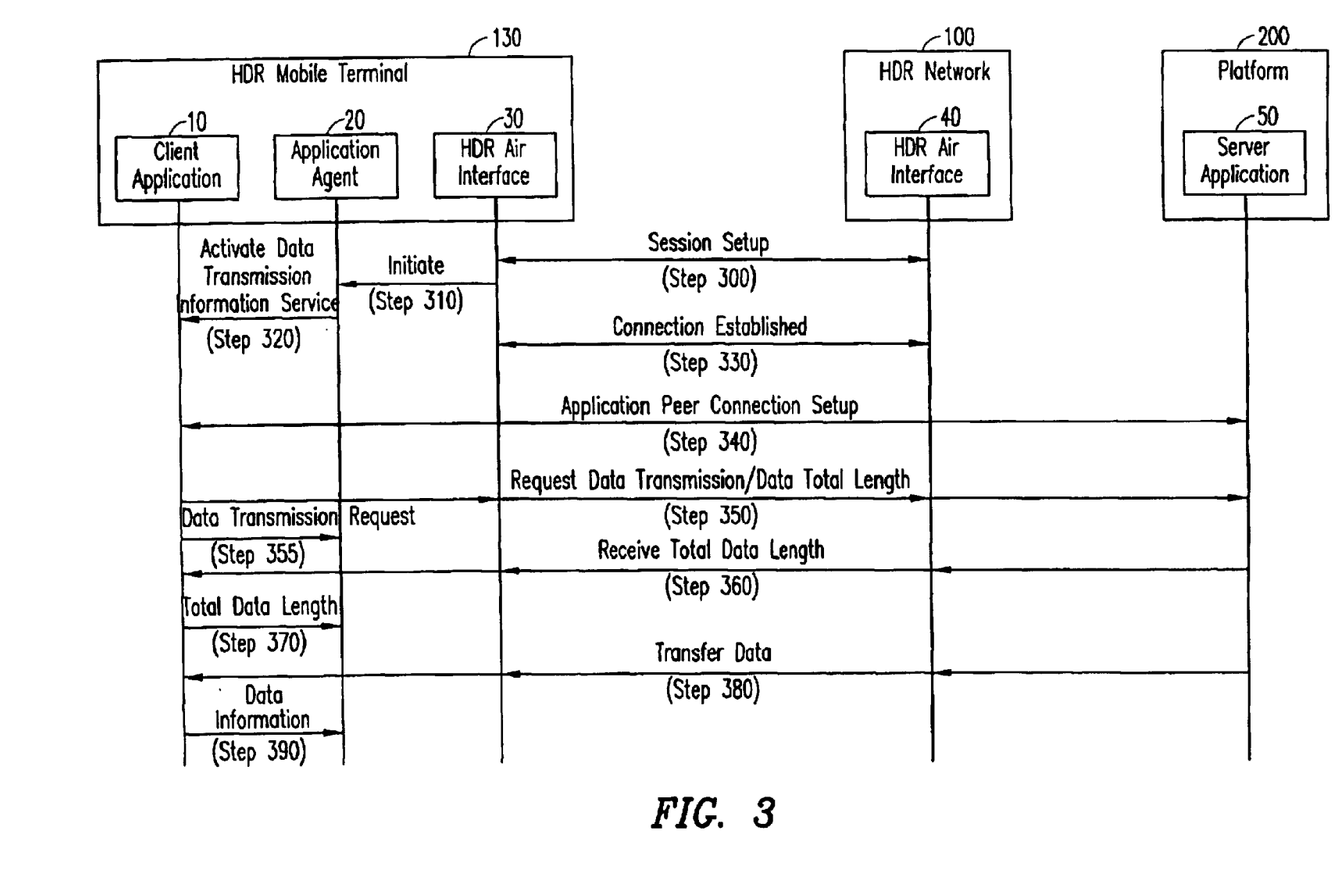
FIG. 3 is a signaling diagram illustrating the exemplary signaling involved during a data session in accordance with embodiments of the present invention.

A more detailed explanation of a data session incorporating the Application Agent 20 functionality is illustrated in the signaling diagram of FIG. 3 of the drawings. Initially, all of the necessary signaling between the HDR air interface logic 30 and 40 of both the HDR mobile terminal 130 and the HDR network 100, respectively, are performed to setup a data session (step 300). Such signaling is well-known in the art, and may include, for example, the HDR mobile terminal 130 pointing it's DRC towards a sector of the HDR network 100, the HDR mobile terminal 130 requesting a forward data rate and the HDR network 100 granting a data rate to the HDR mobile terminal 130. Once the data session is established, the HDR air interface logic 30 initiates the Application Agent 20 to interface with the Application 10 involved in the data session (step 310). At this point, the Application Agent 20 activates a data transmission information service by instructing the Application 10 to report all data length information to the Application Agent 20 (step 320).

Thereafter, a physical radio connection between the HDR air interfaces 30 and 40 of the HDR mobile terminal 130 and HDR network 100, respectively, is established (step 330) and a peer connection is setup between the Application (client) 10 in the HDR mobile terminal 130 and the desired Application (server) 50 on the network side (step 340). When the client Application 10 requests a data transmission (e.g., by sending an HTTP GET request) from the server Application 50, the client Application 10 also requests the total length of the data (step 350). The data transmission request is also sent to the Application Agent 20 (step 355) to notify the Application Agent 20 of the data transfer in progress.

In response to the data transmission request, the server Application 50 transmits the total data length to the client Application 10 (step 360). Due to the activation of the data transmission information service, the client Application 10 passes the total data length to the Application Agent 20 (step 370) for later use in ascertaining whether to perform a VSHO. During the data transfer, the server Application 50 may also transmit data information, such as the amount of data being sent with each transmission, to the client Application 10 (step 380). Periodically, or upon the reception of each data packet, the client Application 10 transmits the data information to the Application Agent 20 (step 390) for use in the VSHO process described hereinbelow in connection with FIGS. 5–7.

Figure 4:
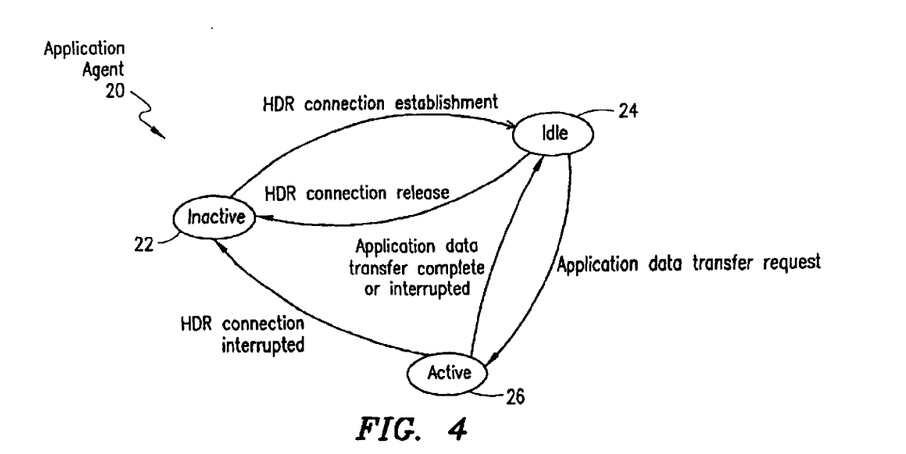
FIG. 4 is a state diagram of the application agent shown in FIG. 2 of the drawings.

The operation of the Application Agent 20 will now be explained in more detail with reference to the state diagram of FIG. 4. The Inactive state 22 is the initial state of the Application Agent 20. The Application Agent 20 enters the Idle state 24 after the HDR radio connection is established for a data session. Once a data transfer request is initiated by an Application within the HDR mobile terminal, the Application Agent 20 transitions to the Active state 26. During the Active state 26, the Application Agent 20 discerns data transmission information from the data information and total data length sent by the Application to assist in the VSHO process. Once the data transfer is complete, or if the data transfer is interrupted, the Application Agent 20 reverts back to the Idle state 24. However, if the HDR connection is abnormally interrupted, the Application Agent 20 bypasses the Idle state 24 and reverts back to the Inactive state 22. At the end of the data session, the Application Agent 20 returns to the Inactive state 22.

Figure 5:
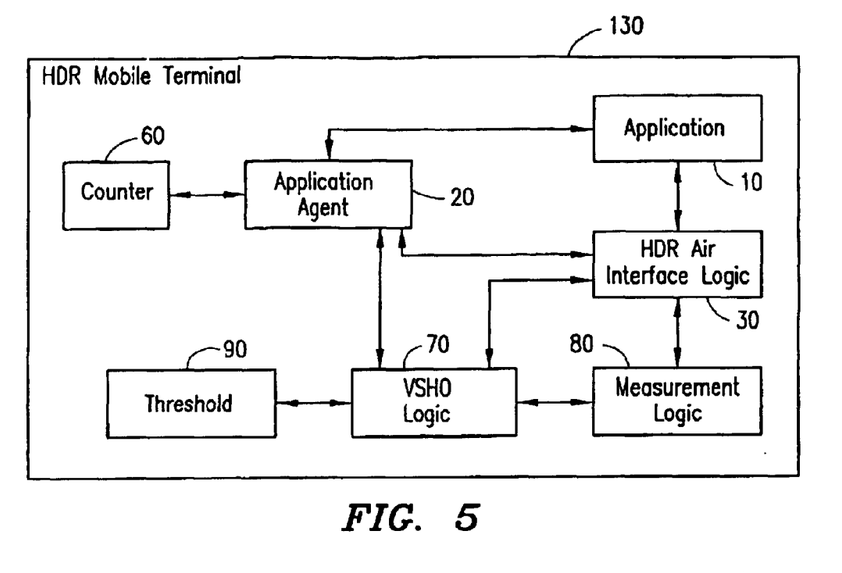
FIG. 5 is a functional block diagram illustrating an exemplary implementation of a Virtual Soft Handover (VSHO) process in accordance with embodiments of the present invention.

Turning now to FIG. 5, there is illustrated a functional block diagram of an HDR mobile terminal implementing the VSHO process of the present invention. As described above in connection with FIG. 2, the Application 10 passes the total data length and data information to the Application Agent 20 during the data transfer process. A counter 60 is shown connected to the Application Agent 20 to count the number of data packets received. In one embodiment, the counter 60 may be initialized with the total data length and decremented each time the Application Agent 20 receives new data information. In another embodiment, the counter 60 may be incremented with each new received data information, and the Application Agent 20 may contain logic for determining the total amount of data remaining to be transmitted to the HDR mobile terminal 130.

The HDR mobile terminal 130 is also shown to include measurement logic 80, which is responsible for measuring radio information, such as the Carrier to Interference (C/I) ratio, for the sectors within the Active set of pilots. It should be understood that other measurements of the radio channel conditions may be used instead of the C/I ratio discussed herein. Each time the measurement logic 80 measures the C/I ratio, the radio measurement information is passed to VSHO logic 70 within the HDR mobile terminal 130. The VSHO logic 70 is responsible for determining whether a VSHO should be performed based on the radio measurement information. The VSHO logic 70 considers the C/I ratio of each sector within the Active set of pilots to determine whether a higher data rate may be able to be obtained from a sector not having the HDR mobile terminal's DRC pointed towards it.

In accordance with embodiments of the present invention, the VSHO logic 70 also receives data transmission information (i.e., the total number of packets and the number of packets remaining to be transmitted) from the Application Agent 20. Therefore, the VSHO logic 70 makes the decision of whether to perform a VSHO according to the total number of packets, number of packets remaining for transmission and the radio channel conditions (C/I measurement information). It should be understood that the data transmission information may include any information related to the amount of data involved in the data transfer process, and is not limited to any of the specifically listed examples.

To make the decision, the VSHO logic 70 may use one or more thresholds 90 stored within a memory within the HDR mobile terminal 130. For example, one threshold 90 may set the minimum total data length required before a VSHO may be performed. Another threshold 90 may set the minimum amount of remaining data required for performing a VSHO. It should be understood that different thresholds 90 may be used depending upon the implementation by the HDR mobile terminal 130 or the network provider. It should further be understood that the threshold(s) 90 may be included within the HDR mobile terminal 130 or downloaded to the HDR mobile terminal 130 from the HDR network.

Figure 6:
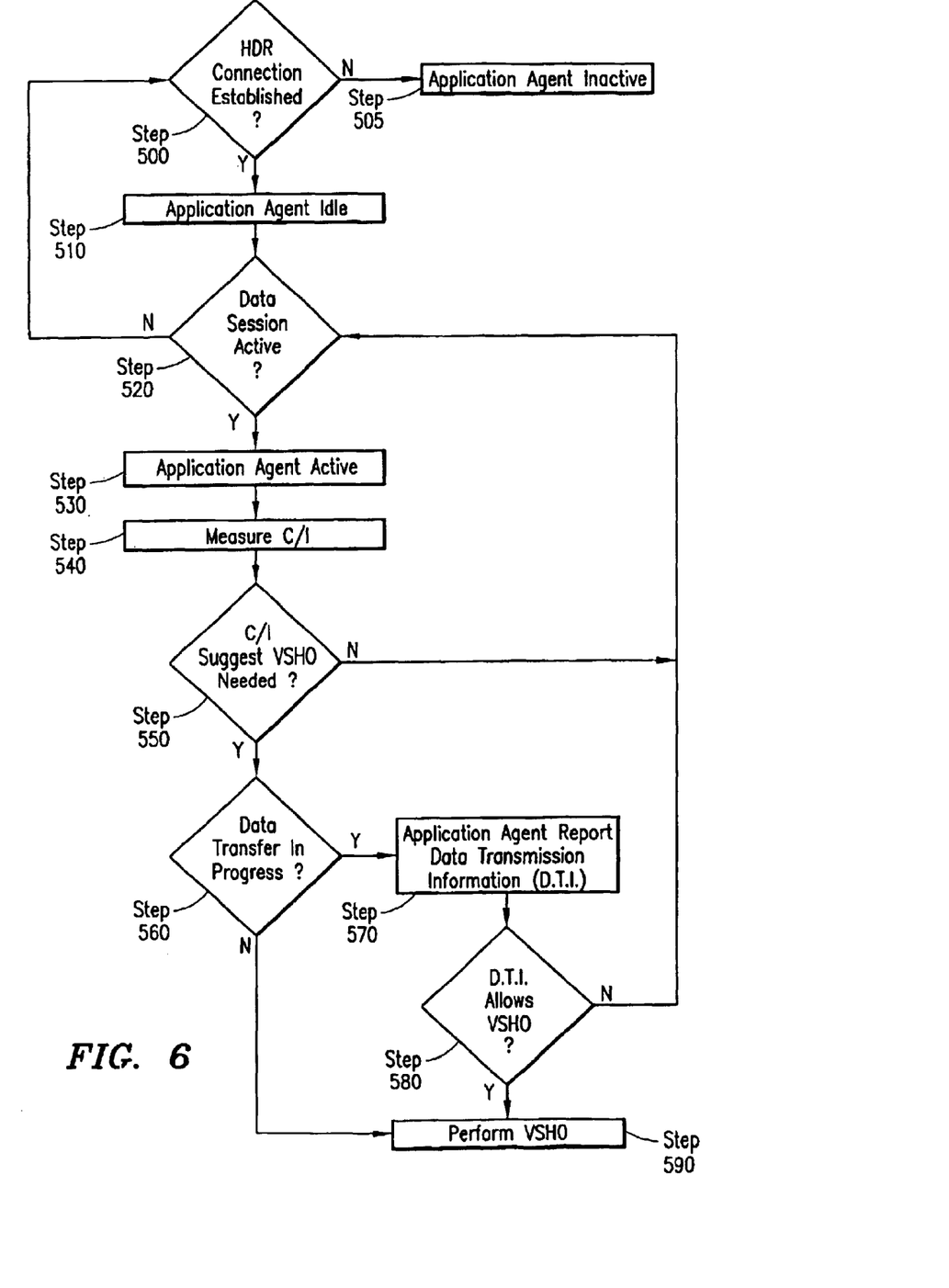
FIG. 6 is a flowchart illustrating the exemplary steps for implementing the VSHO process during a data session in accordance with embodiments of the present invention.

Referring now to FIG. 6 of the drawings, there is illustrated exemplary steps for implementing the VSHO process during a data session in accordance with embodiments of the present invention. As described above in connection with FIG. 4, if an HDR radio connection has not yet been established (step 500), the Application Agent is in the Inactive state (step 505). However, once the HDR radio connection is established (step 500), the Application Agent enters the Idle state (step 510). Thereafter, if a data transfer request is sent by the client Application (step 520), the Application Agent transitions to the Active state for the duration of the data transfer process (step 530).

While in the Active state, the HDR mobile terminal may make radio (C/I) measurements (step 540). If the radio measurement information indicates that a VSHO is needed (step 550), and the data transfer is still in progress when the radio measurements are complete (step 560), the Application Agent reports the data transmission information (step 570) for use in determining whether to initiate the VSHO (steps 580 and 590). However, if the data transfer has been completed (step 560), the VSHO is performed (step 590) based only on the radio measurement information.

Figure 7:
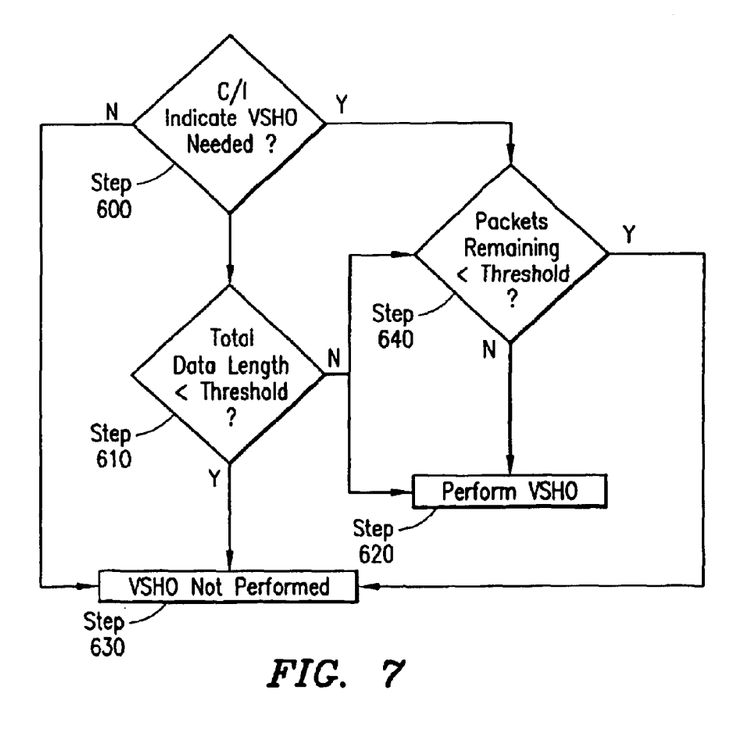
FIG. 7 is a flowchart illustrating the exemplary steps of the VSHO process in accordance with embodiments of the present invention.

The VSHO decision process is described in more detail with reference to FIG. 7. If the radio measurement information indicates that a VSHO is needed during a data session (step 600), the data transmission information may be used in a number of different ways to determine whether to perform the VSHO. For example, in one embodiment, if the data transmission information includes at least the total data length, the VSHO may be performed (step 620) only if the total data length is less than a threshold (step 610). Therefore, VSHO's are not performed (step 630) when the total data length of a data transfer is small as compared to the signaling and redundant Abis interface traffic necessitated by the VSHO process.

Alternatively, in another embodiment, if the data transmission information includes at least the data transmission status, such as the number of data packets remaining to be transmitted, the VSHO may be performed (step 620) only if the number of remaining data packets is less than a threshold (step 640). Therefore, the VSHO is not performed (step 630) when the data transfer is near the end. In still another alternative embodiment, if the data transmission information includes both the total data length and the data transmission status, the VSHO is performed (step 620) only when the total data length is less than a first threshold (step 610), and the number of remaining packets is less than a second threshold (step 640). Therefore, the VSHO is not performed (step 630) when the total data length of a data transfer is small and the data transfer itself is near the end.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A high data rate mobile terminal in wireless communication with a high data rate telecommunications network wherein said mobile terminal is in wireless communication with a first sector of said high data rate telecommunications network to establish a data session, comprising:

an application agent for determining data transmission information relating to an amount of data remaining to be transmitted from said mobile terminal to said telecommunications network during a data transfer in progress during said data session;

means for determining whether to perform a virtual soft handover from the first sector to a second sector, said means for determining further comprising:

measurement logic adapted to measure radio information indicating the radio channel conditions for at least said first sector and said second sector, handover logic adapted to determine whether a second radio channel condition associated with said second sector is better than a first radio channel condition associated with said first sector;

in response to said determination that said second radio channel condition is better than said first radio channel condition, said handover logic further adapted to determine whether to perform said virtual soft handover from said first sector to said second sector based on said data transmission information.

2. The mobile terminal of claim 1, wherein said means for determining further comprises:

means for storing at least one threshold information, said handover logic being further adapted to compare said data transmission information to said at least one threshold information to determine whether to perform said handover.

3. The mobile terminal of claim 2, wherein said at least one threshold information includes a total data length threshold value, said data transmission information including at least a total data length of said data transfer, said handover logic being further adapted to decide to not perform said handover when said total data length of said data transfer is less than said total data length threshold value.

4. The mobile terminal of claim 2, wherein said data transmission information including at least a data transmission status, said handover logic being further adapted to decide to not perform said handover when said data transmission status is less than said threshold information.

5. The mobile terminal of claim 4, wherein said data transmission status includes the number of data packets remaining to be transmitted from said mobile terminal.

6. A high data rate telecommunications network, including:

first and second sectors each providing high data rate radio coverage, comprising:

a high data rate mobile terminal in wireless communication with said first by establishing a data session within said first sector for performing data transfer between said mobile terminal and said high data rate telecommunications network, said high data rate mobile terminal comprising means for performing a virtual soft handover from said first sector to said second sector, further comprising:

means for measuring radio information indicating the radio channel conditions for at least said first sector and said second sector and determining whether said radio channel condition for said sector is better than the first sector;

application agent for determining data transmission information relating to an amount of data remaining to be transmitted from said mobile terminal to said telecommunications network for said particular data session; and in response to said determination that said sector is better, means for determining to perform said virtual soft handover to said sector further based on said data transmission information.

7. The network of claim 6, wherein said mobile terminal comprises means for storing threshold information including at least one threshold stored therein, said mobile terminal being further adapted to compare said data transmission information to said at least one threshold to determine whether to perform said handover.

8. The network of claim 7, wherein said at least one threshold includes a total data length threshold, said data transmission information including at least a total data length of said data transfer, said mobile terminal being further adapted to decide to not perform said handover when said total data length of said data transfer is less than said total data length threshold.

9. The network of claim 7, wherein said data transmission information including at least a data transmission status, said mobile terminal being further adapted to decide to not perform said handover when said data transmission status is less than said threshold.

10. A method for determining whether a high data rate mobile terminal in wireless communication with a first sector of a high data rate telecommunications network should perform a handover of a data session to a second sector within said high data rate telecommunications network, comprising:

measuring radio information indicating the radio channel conditions for at least said first sector and said second sector; and in response to a determination that said radio channel conditions recommends a virtual software handover from said first sector to said second sector;

determining data transmission information relating to an amount of data remaining to be transmitted from said mobile terminal to said telecommunications network during a data transfer in progress during said data session; and determining whether said handover of said data session should be performed to said second sector of said high data rate telecommunications network based on said data transmission information.

11. The method of claim 10, wherein said step of determining further comprises:

comparing said data transmission information to at least one threshold to determine whether to perform said handover.

12. The method of claim 11, wherein said at least one threshold includes a total data length threshold and said data transmission information includes at least a total data length of said data transfer, and wherein said step of determining further comprises:

not performing said handover when said total date length of said data transfer is less than said total data length threshold.

13. The network of claim 11, wherein said data transmission information includes at least a data transmission status, and wherein said step of determining further comprises:

not performing said handover when said data transmission status is less than said threshold.

14. The method of claim 10, wherein said step of determining further comprises:

receiving data information associated with said data transfer;

determining said data transmission information using said data information.

15. The method of claim 14, wherein said data information includes the number of data packets received with each transmission of said data transfer.

16. The method of claim 15, wherein said data information further includes a total data length of said data transfer end wherein said step of determining said data transmission information further comprises:

initializing a counter with said total data length; and decrementing said counter with each said data information received.

* * * * *